United States Patent [19]

Ross et al.

[11] 4,451,427
[45] May 29, 1984

[54] IN-CORE FUEL MANAGEMENT FOR NUCLEAR REACTOR

[75] Inventors: Malcolm F. Ross, Bloomfield; Sidney Visner, W. Hartford, both of Conn.

[73] Assignee: Combustion Engineering, Inc., Windsor, Conn.

[21] Appl. No.: 209,165

[22] Filed: Nov. 21, 1980

Related U.S. Application Data

[63] Continuation of Ser. No. 874,955, Feb. 3, 1978, abandoned.

[51] Int. Cl.³ ............................................. G21C 19/20
[52] U.S. Cl. .................................................... 376/267
[58] Field of Search ......................................... 376/267

[56] References Cited

U.S. PATENT DOCUMENTS

| | | | |
|---|---|---|---|
| 2,992,174 | 7/1961 | Edlund et al. | 376/267 |
| 3,194,743 | 7/1965 | Deddens et al. | 376/267 |
| 3,382,153 | 5/1968 | Bigge et al. | 376/267 |
| 3,396,078 | 8/1968 | Visner | 376/267 |
| 3,432,389 | 3/1969 | Stern | 376/267 |
| 4,324,615 | 4/1982 | Kobayashi et al. | 376/267 |
| 4,326,919 | 4/1982 | Hill | 376/267 |

OTHER PUBLICATIONS

Annals of Nuc. Eng., vol. 4, No. 9/10, (1977), pp. 409–415, Chen et al.
"Nuclear Power Plant Design Analysis", A. Sesonske, TID–26241, USAEC, (1973), pp. 336–343.
Trans. A.N.S., vol. 15, No. 1, (1972), pp. 104–105, "Fuel Management with Lumped Burnable Poison," Jones.

Primary Examiner—Sal Cangialosi
Attorney, Agent, or Firm—L. James Ristas

[57] ABSTRACT

An arrangement of square fuel assemblies in the first and subsequent cycles of a pressurized water nuclear reactor wherein shimmed feed assemblies and once-burned or equivalent assemblies occupy the same checkerboard component of alternating diagonals in an inner region of the core, and the highest burned or equivalent assemblies occupy the other checkerboard component. The remainder of the core consists of an outer region containing another checkerboard of feed assemblies wherein the feed assemblies occupy less than one-half the assembly locations on the core periphery.

19 Claims, 11 Drawing Figures

| | | | | 1<br>D<br>401 | 2-05<br>C | 3<br>D<br>401 | 4-53<br>CH |
|---|---|---|---|---|---|---|---|
| | | 5-07<br>CL | 6<br>D<br>401 | 7-12<br>CL | 8<br>D*<br>403 | 9-08<br>BL | 10-11<br>C |
| | 11-09<br>CH | 12<br>D<br>401 | 13-21<br>BL | 14<br>D*<br>402 | 15-14<br>BL | 16<br>D*<br>404 | 17-42<br>BH |
| | 18-35<br>CL | 19<br>D<br>401 | 20-16<br>BL | 21<br>D*<br>402 | 22-40<br>BH | 23-03<br>C | 24-30<br>BH | 25<br>D*<br>405 |
| | 26<br>D<br>401 | 27-28<br>BL | 28<br>D*<br>402 | 29-60<br>BH | 30-02<br>C | 31-23<br>BH | 32-01<br>C | 33-25<br>BH |
| 34<br>D<br>401 | 35-19<br>CL | 36<br>D*<br>402 | 37-48<br>BH | 38-43<br>C | 39-58<br>BH | 40<br>D*<br>406 | 41-32<br>BH | 42-04<br>C |
| 43-18<br>C | 44<br>D*<br>403 | 45-36<br>BL | 46-52<br>C | 47-46<br>BH | 48<br>D*<br>406 | 49-54<br>BL | 50-06<br>CL | 51-10<br>BL |
| 52<br>D<br>401 | 53-44<br>BL | 54<br>D*<br>404 | 55-38<br>BH | 56-34<br>C | 57-56<br>BH | 58-26<br>CL | 59-50<br>BH | 60<br>D*<br>407 |
| 61-53<br>CH | 62-11<br>C | 63-66<br>BH | 64<br>D*<br>405 | 65-64<br>BH | 66-61<br>C | 67-10<br>BL | 68<br>D*<br>407 | 69-13<br>A |

FIG. 4

IN-CORE FUEL MANAGEMENT FOR NUCLEAR REACTOR

This is a Continuation of application Ser. No. 874,955, filed Feb. 3, 1978, now abandoned.

BACKGROUND OF THE INVENTION

The present invention relates to fuel management for pressurized water nuclear reactors, and in particular to the arrangement of nuclear fuel assemblies within a reactor core.

Modern commercial nuclear power reactors are fueled with uranium having a slightly enriched U-235 content, which necessitates that portions of the core be periodically removed and replaced with fresher fuel. The plan of replacement and arrangement of fuel during the life of the reactor, known as in-core fuel management, is a major design consideration, having both safety and economic consequences. In a typical pressurized water nuclear power reactor (PWR), the initial core loading consists of three approximately equal sized batches of fuel assemblies having different enrichments. In conventional terminology, batch A has the lowest enrichment, batch B a higher enrichment, and batch C the highest enrichment. At the end of the first cycle, typically one year in length, batch A is removed from the reactor, batches B and C are rearranged, and a feed batch D of fresh fuel is placed in the reactor. This procedure is typical of three batch in-core fuel management wherein an entire batch of fuel is removed and replaced with the same number of feed fuel assemblies every year for the life of the plant. It is usually desirable to achieve an equilibrium in-core fuel management scheme as early as possible in the plant lifetime, such that the feed assemblies will always have the same enrichment and will be placed in the same locations as the previous feed assemblies, and the once-burned and twice-burned assemblies that remain in the core will be shuffled to identical locations occupied by the previously once and twice-burned assemblies.

Having introduced the nature of the art to which the invention pertains, and before proceeding to a more detailed description of the background of the invention, a review of the terminology commonly used in the art of nuclear reactor fuel management will be presented with a view towards defining the terms for specific use herein.

A fuel assembly is a square array of fuel rods connected at their ends by end fittings to form a unit that is insertable and removable from the core. Other structure that remains fixed with respect to the fuel rods and end fittings during a particular cycle is also considered part of the fuel assembly. The fuel lattice within the assembly is the array of fuel rod locations of the assembly, excluding water holes. Water holes are locations in the fuel assembly where fuel rods are intentionally omitted, usually in order to provide space for instrumentation or for a control rod guide tube. These tubes are part of the structural support of the assembly and provide guides wherein control rods may be reciprocated. Fixed burnable poison shims are solid material in the fuel assembly containing parasitic neutron absorbing poison having a concentration which permits most or all of the poison to be consumed during one or more cycles in the reactor. The enrichment of the fuel rods relates to the fissile isotope content at the time of first introduction into the reactor core, i.e., when it is fresh, or feed, fuel.

A batch is a group of fuel assemblies that are placed into, and then permanently removed from, the core together. A lot is a group of fuel assemblies that are placed into the core at the same time, but which may or may not be permanently removed at the same time. A cycle is the time during which the arrangement of normally stationary fuel in the reactor core is unchanged, usually beginning with the placement of a feed batch or lot of fresh fuel into the core, and ending with the removal of highly burned assemblies. For the purposes relevant hereto, a cycle requires that the fissile material in the fuel actually produce power and experience partial depletion. Typical cycles range from 10 to 15 months in duration. The number of burns an individual fuel assembly or a lot of fuel has experienced is the number of cycles it has been in the reactor core.

A checkerboard is a pattern, superimposed on a grid region of adjacent parallel rows and columns of uniformly spaced squares, that is similar to the red and black color pattern that appears on the checkers game board. A checkerboard is characterized in that a line drawn through the diagonal of a single red square will, if extended in either direction throughout the region, intersect only red squares, and similarly for the black squares. In the present context, checkerboarding fuel assemblies in the reactor core means that one type or types of assemblies correspond to the red component squares on the game board, and other types of assemblies correspond to the black component squares on the board. The core periphery consists of the fuel assembly locations in the core where more than a mere corner of a fuel assembly borders on the neutron reflector at the outer boundary of the core.

It is a primary purpose of in-core fuel management to minimize the amount of U-235 or other fissile material required for a given energy output during a given cycle. This can be appreciated by the rule of thumb that for every 0.1 effective weight percent (wt %) increase in required core average enrichment, the increased cost of fuel for that cycle is over 2 million dollars. Typical equilibrium cycle core average enrichments are about 3.3 wt % U-235. It can also be appreciated that the greatest savings in overall fuel costs will be achieved by minimizing the feed enrichment required for an equilibrium fuel management scheme.

The major constraint on the flexibility of in-core fuel management is imposed by very strict power distribution limitations required by safety considerations. For example, the predicted ratio of the powers produced in the hottest fuel rod to the core average fuel rod is typically not permitted to exceed 1.40. This imposes correlative requirements on the ratio of power produced in a fuel assembly to the core average assembly power, and on the maximum rod power within an assembly to the average power in the assembly containing that rod. In modern commercial PWR's, fixed burnable poison shims are frequently located in selected assemblies to control the power distribution. These shims are strongly absorbent when the assembly is first placed in the core, and become weaker the longer they are exposed to the operating core environment. Although the shims are useful for controlling the power distribution and other core characteristics such as the moderator temperature coefficient, the presence of residual shim poison at the end of a cycle presents an inherent reactivity penalty, and requires a greater initial U-235 enrichment (and cost) at the beginning of each cycle in order to overcome the parasitic neutron absorbing effect of the residual.

The use of shims as a power shaping means has traditionally been directed primarily to controlling the power distribution within and between assemblies, but the use of significant numbers of shims will also affect the gross power shape in the reactor. This has economic consequences in that a power shape that is peaked radially toward the center of the core will be more efficient in conserving neutrons within the reactor so that they may produce additional fissions, than a power shape that is peaked near the core periphery, where neutrons will leak out of the reactor and never return. Thus, for the same core average initial enrichment (and assuming zero end of cycle shim residual), a longer cycle can be achieved when the power shape near end of cycle is centrally peaked than when it is more uniform or peripherally peaked.

FIG. 1 symbolically shows two of the most common prior art fuel management techniques implemented in a core having 241 fuel assembly locations. Each is a three batch second cycle scheme for achieving the same power level and cycle length, but the arrangement of the fuel types is characteristic of the respective schemes in other cycles. The highly reactive feed fuel (D) is shown as crosshatched squares 10, 10', the less reactive once-burned (C) fuel as open squares 12, and the least reactive once-burned (B) fuel as crossed squares 14. Note that in a first cycle all batches A, B, and C, would be fresh, but the different enrichments could be represented by the three symbols, and in cycles after the second the crossed squares 14 would represent twice-burned fuel.

In order to facilitate a later description of cycle-independent fuel management, fuel loadings will be designated by their relative lots. Thus, lot L is the feed or fresh lot 10, 10', L-1 the previously loaded fresh fuel 12, L-2 the next previously loaded fresh fuel 14, etc., except that in the first cycle L, L-1, and L-2 correspond to the customary C, B, and A lots, respectively, and in second cycle L, L-1, L-2, L-3 correspond to D, C, B, and A, respectively. In equilibrium cycles, the numerical portion N of the L-N designation can be thought of as the number of cycles the lot has previously resided in the core, i.e. the number of burns it has experienced.

The upper left quadrant (a) of FIG. 1 shows what is commonly referred to as the Out-In (OI) prior art fuel management scheme. This is characterized by un-shimmed feed (L) fuel 10 placed at the core periphery to the extent possible. Any feed assemblies that are left over are located towards the periphery and surrounded to the extent possible by twice-burned (L-2) fuel 14. In the next cycle, the feed fuel will have become once-burned (L-1) fuel 12, and as shown in (a), the once-burned fuel 12 is concentrated in the core center. In general, the OI scheme has an inner region of once-burned fuel 12, a peripheral region of feed fuel 10, and an intermediate region of primarily twice-burned 14 mixed with some feed 10 and once-burned 12 fuel. It is noted that this concept for arranging fuel has also been used in first cycle designs.

The OI fuel management has the advantage of providing a relatively flat cosine gross core radial power shape, which helps avoid excessive local peaking. But as the fuel is depleted during the cycle, the gross power tends to shift towards the core periphery where the fresh fuel is located. The relatively high peripheral power, however, produces a high neutron leakage, especially at end of cycle (EOC) when the interior of the core has been depleted and the exterior is still relatively highly reactive.

A prior art attempt to improve the neutron economy and reduce the required enrichment of the OI scheme is shown in (b) of FIG. 1, which will be referred to as the In-Out-In (IOI) scheme. In this scheme, all feed (L) assemblies 10' contain burnable poison shims (represented by circles) and are placed towards the center of the core in a checkerboard pattern that alternates components of L assemblies 10' with components of twice-burned (L-2) assemblies 14. The L component is violated near the core center (assembly locations 50, 58) in order to accommodate the well known tendency of the power distribution to peak in this area. All once-burned (L-1) fuel 12 is placed as far as possible towards the core periphery. Thus, the IOI scheme is characterized by an inner checkerboard of feed fuel and twice-burned fuel and an outer region of once-burned fuel. The IOI scheme as practiced in the prior art requires that the shims in the feed fuel assemblies be removed after one cycle. The IOI scheme thus places fresh shimmed fuel in the center region, then removes the shims at the end of the cycle so that at the beginning of the next cycle the once-burned fuel contains no shims. Since the twice-burned fuel was previously a once-burned fuel, it also contains no shims.

The major advantage of the IOI scheme is the low neutron leakage from the core periphery resulting from the tendency of the power distribution to remain centrally peaked throughout the burnup cycle. In addition to permitting a lower initial enrichment for the same energy extraction, the centrally peaked power distribution produces a lower radiation exposure to the reactor internals and vessels surrounding the core, and has other advantages related to the stability of the power distribution.

The prior art requirement in the IOI scheme that the shims be removed at the end of the first cycle of exposure of the feed assemblies has an inherent disadvantage which limits the flexibility of fuel management. The purpose of shimming the feed fuel is to control the power shape so that the fresh fuel in the central region of the core will not produce power too great in relation to the core average power. This control requires such a high initial concentration of poison material in the shims that the poison does not burn out by EOC and therefore a significant parasitic effect remains. Nevertheless, the advantage of the lower neutron leakage from the periphery is greater than the disadvantage at end of cycle of having a significant posion shim residual. By removing these shims prior to the next cycle, the parasitic shim effect is not carried over into the next cycle. In order for the shims to be easily removed, however, they are placed in guide tubes normally reserved for control rods rather than being permanently integrated in the fuel lattice. This precludes the placement of feed assemblies under control rods in the IOI scheme, and thus eliminates one-third or more core locations from use with feed assemblies. Such loss of fuel placement flexibility can be particularly restrictive if the energy extraction or cycle length is to be varied from equilibrium IOI values. In order to best accommodate a non-equilibrium cycle or to optimize the return to equilibrium, fresh fuel might well be ideally placed in some of these locations yet cannot be without abandoning the prior art IOI scheme. In addition, the limited flexibility of the IOI scheme is even more evident if the scheme is used in cores employing more advanced control rod designs wherein up to twelve control rod fingers are insertable into five adjacent assemblies by the action of a single drive mechanism. These control rods permit greater reactivity control and offer other significant advantages, yet are generally impossible to use in cores having many of the control rod guide tubes occupied for other purposes, as in the IOI scheme.

If the prior art IOI scheme is modified so that the shims are left in each feed assembly at the end of cycle C and not removed when the assembly is shuffled into a once-burned location on the core periphery in cycle C+1, the residual shim absorption near the periphery will tend to accentuate the power near the core center, requiring that the cycle C+1 feed batch have even stronger shims to control the power peak at the beginning of cycle C+1. The fresh fuel will than have an even greater shim residual at the end of cycle C+1 and, when this fuel is placed on the periphery in cycle C+2 the peripheral power will be even further depressed requiring even stronger initial shim loadings on the next batch of feed fuel. The end of cycle residual thus would become so large as to dissipate the advantage in the IOI scheme of low neutron leakage.

SUMMARY OF THE INVENTION

It is an object of the present invention to reduce the required core enrichment relative to the prior art OI fuel management, and to increase fuel placement flexibility relative to the prior art IOI fuel management, without exceeding acceptable power distribution limits. It is another object to achieve this improvement without the necessity of removing shims from the assemblies.

The present invention exhibits the major benefits of the two important prior art PWR fuel management schemes, yet it is independent of them. The invention is an in-core fuel management scheme for a PWR core wherein the arrangement of fuel assemblies resulting from satisfying certain empirical reactivity relationships among assemblies can be characterized by reference to an imaginary boundary between a radially inner region containing about two-thirds of the assemblies in the core and a radially outer region containing the remainder of the assemblies. The inner region comprises a checkerboard pattern of fuel assemblies in which feed (L) assemblies and once burned (L-1) assemblies occupy at least two-thirds of one component of the checkerboard, and once or greater burned (L-1, L-2, L-3, . . . L-N) assemblies occupy the other component. At least some of the feed assemblies in the inner region contain fixed lumped burnable poison shims.

In the ideal embodiment, the first component of the inner checkerboard consists entirely of shimmed L assemblies and L-1 assemblies, and the second component comprises twice or greater burned assemblies. The outer region is characterized by another checkerboard pattern, one component of which consists entirely of feed (L) assemblies and the other of once and higher burned (L-1, L-2, . . . L-N) assemblies. The feed (L) component on the outer region need not match the feed and once-burned component of the checkerboard in the inner region.

When used for the first cycle of operation, where all fuel assemblies are unburned, the highest enrichment (batch C) corresponds to the feed (L) assemblies and the next highest enrichment (batch B) corresponds to the once-burned (L-1) assemblies. The invention may thus be used in any cycle of reactor operation and with any refueling schedule.

The present invention offers typical core average enrichment savings relative to the prior art OI schemes of over 0.1 wt % in equilibrium cycles, 0.2 wt % in second cycle, and about 0.05 wt % in first cycle. In addition, the invention permits the shims to remain in place in the assemblies throughout their lifetimes in the core, without restricting the placement of the assemblies under control rods.

The advantage of the invention over the IOI scheme is achieved by eliminating the requirement for a sizable poison residual to suppress the power in the feed (L) assemblies at the end of cycle. Therefore, the shims can be initially weak enough to allow the poison material to burn out to essentially zero shim residual during the first cycle they are in the core. In the prior art IOI, the high shim worth is needed at beginning and end of cycle to control the centrally peaked power distribution caused by the concentration of fresh fuel in the central region. By replacing some of the feed assemblies with once-burned fuel, the invention places slightly less reactive (L-1) assemblies in the feed fuel component of the inner checkerboard, thereby reducing the inherent reactivity of the central region of the core relative to a completely filled feed fuel component. Thus, the inherent tendency for central power peaking at beginning and end of cycle is lower than in the IOI scheme, and the need for control of this central power with poison shims is also reduced. With the present invention, the shim worth residual at the end of cycle is low enough, less than 0.5 percent K, to have only a slight effect on the power distribution at the beginning of the next cycle. Therefore, the feed fuel in the next cycle does not require excessively strong shims in order to compensate for the residual remaining in the L-1 assemblies, as would be the case in the IOI scheme if the shims in the L assemblies were not removed prior to the start of the next cycle when the previously fresh fuel assemblies become L-1 assemblies.

BRIEF DESCRIPTION OF THE DRAWINGS

FIG. 4 shows the present invention in a second cycle scheme that immediately follows the first cycle scheme shown in FIG. 3.

DESCRIPTION OF THE PREFERRED EMBODIMENT

As set forth in the Background of the Invention, in-core fuel management is a very important feature of nuclear power plant design. Therefore, much time and money is spent by nuclear reactor vendors to optimize the fuel management for each particular reactor through the use of detailed computer simulation prior to fuel fabrication. All data presented in the following description of the invention were generated in the course of a computer simulated verification that the inventive concept would indeed satisfy the above-recited objectives of the invention. The calculational models for implementing the invention are well-known in the art of nuclear reactor fuel management, and the following description used in conjunction therewith will enable one ordinarily skilled in this art to adapt the invention for use in any size PWR for any fuel cycle requirements ordinarily desired for large electric power generating stations.

Figure 2A:
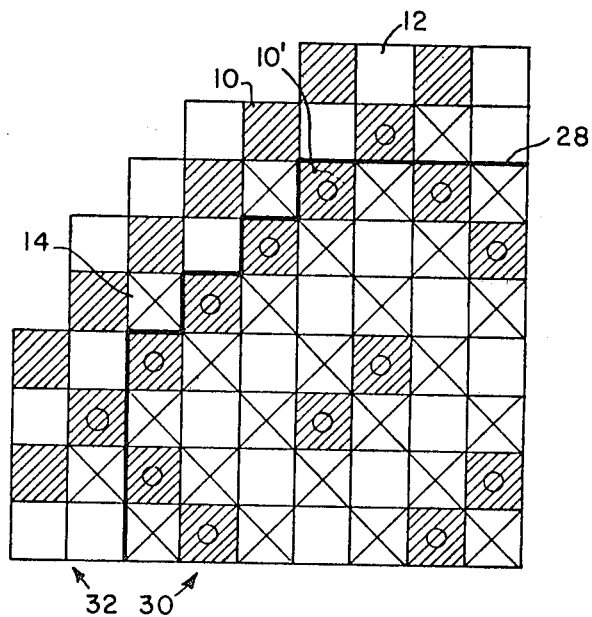
FIG. 2(a) shows a symmetric quadrant embodying the present invention in a manner that facilitates comparison with the prior art shown in FIG. 1.

In one embodiment, the invention is implemented in a reactor core that has previously been loaded with fuel for one or more cycles according to some prior art scheme. Such an embodiment is illustrated in FIGS. 2(a) and 4, where a second cycle embodying the invention immediately follows the prior art OI first cycle shown in FIG. 3. The following table, used in conjunction with FIG. 3, summarizes the important fuel design properties of the OI first cycle, and will serve as a reproducible starting point for practicing the embodiment of the invention described hereinbelow.

TABLE 1

Figure 3:
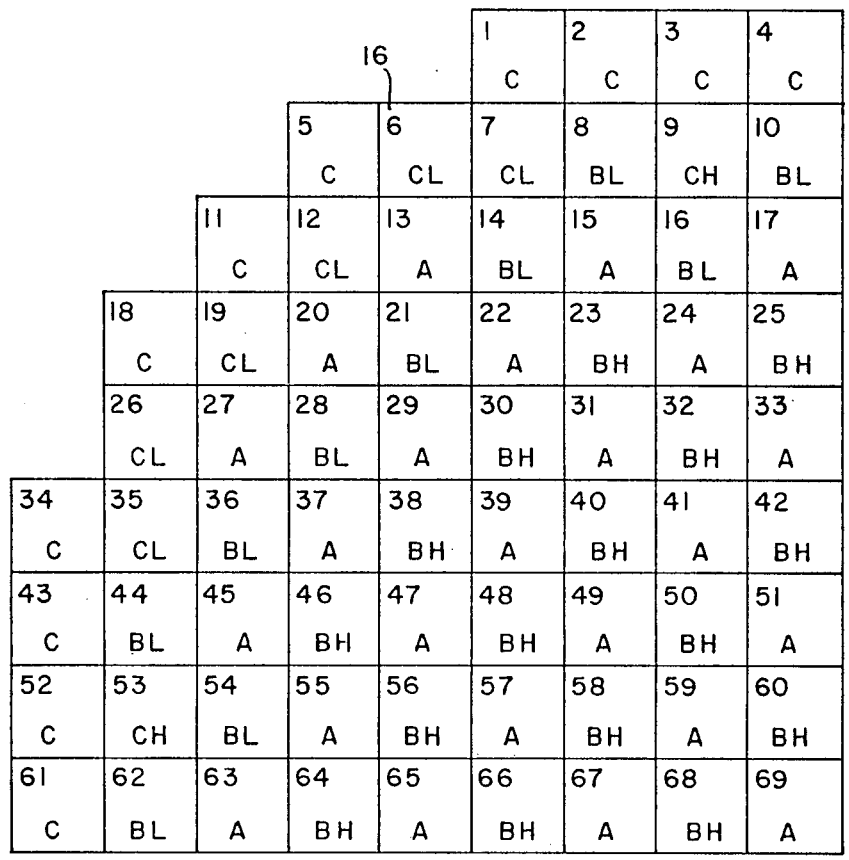
FIG. 3 shows a typical prior art OI scheme for the first cycle of a core having a total of 241 assembly locations.

| | Fuel Design for First Cycle Prior Art Out-In Scheme Shown in FIG. 3 | | | | |
|---|---|---|---|---|---|
| Assembly Type | No. Shims in Assembly | No. Assemblies | Enrichment (wt. % U-235) | No. Fuel Rods | Shim Loading (wt. % $B_4C$ in $B_4C-Al_2O_3$) |
| A  | 0  | 81 | 1.83 | 19116 | —    |
| BL | 16 | 36 | 2.49 | 7920  | 2.76 |
| BH | 16 | 52 | 2.49 | 11440 | 3.37 |
| CL | 16 | 24 | 2.95 | 5280  | 2.04 |
| CH | 16 | 8  | 2.95 | 1760  | 3.37 |
| C  | 0  | 40 | 2.95 | 9440  | —    |

Figure 5:
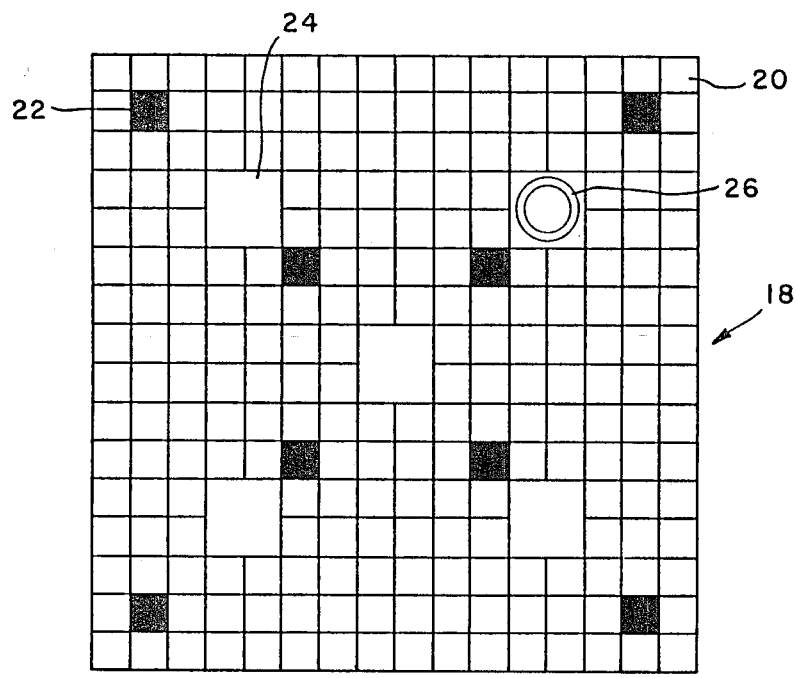
FIG. 5 shows a schematic fuel assembly having a 16×16 fuel lattice, 5 water holes, and 8 lattice shims.

In FIG. 3, the numeral 16 in the upper left corner of each assembly identifies an assembly location. Location number 69 is at the core center, and the parts of the core not shown and the fuel contained therein are merely reflections along the major axes. A schematic of a typical fuel assembly 18 is shown in FIG. 5, where fuel rods 20, fixed burnable poison lattice shims 22, water holes 24, and guide tubes 26 (one shown) are represented. More details of the core and fuel assembly designs can be found in the Combustion Engineering Standard Safety Analysis Report (CESSAR) Docket No. STN-50-470 Section 4.3 (1975), which is incorporated by reference.

Figure 1:
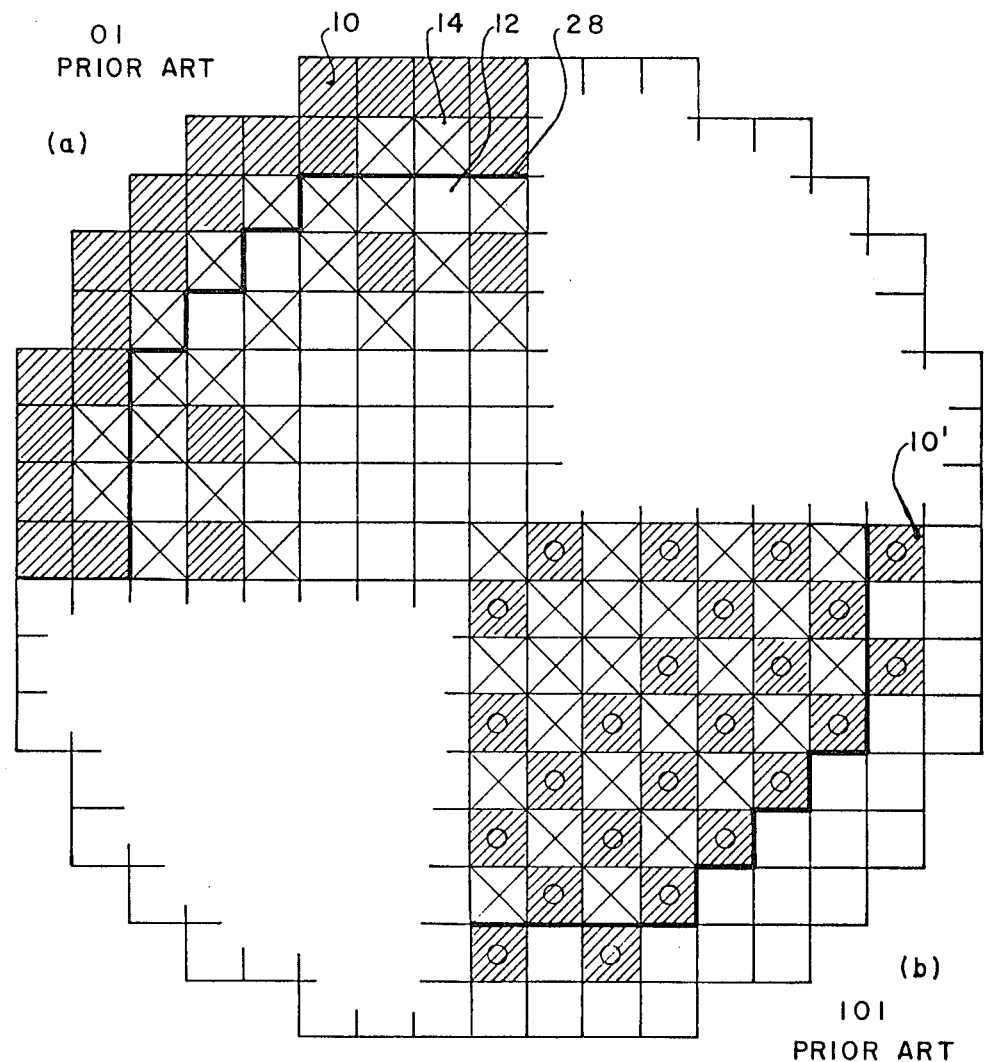
FIG. 1 shows two prior art in-core fuel management schemes for a core having 241 assembly locations. The upper left quadrant (a) shows one symmetric quadrant of an OI scheme and the lower right quadrant (b) shows a symmetric quadrant of an IOI scheme.

In order to more clearly compare and distinguish the invention from the prior art, FIGS. 1(a) and 1(b) show how the prior art would be used to design a second cycle following the same 13,800 MWD/T first cycle shown in FIG. 3. In the OI prior art second cycle scheme shown in FIG. 1(a), the A assemblies are removed (except that the most reactive A assembly is moved to the core center), the B fuel 14 and C assemblies 12 relocated as shown, and unshimmed D assemblies 10 having an average enrichment of 3.50 wt % are inserted. The beginning of cycle 2 (BOC2) core average initial enrichment is 2.97 wt %, sufficient for a second cycle burnup of 10,000 MWD/T. In the IOI cycle 2 prior art scheme shown in FIG. 1(b), the D assemblies 10' are shimmed and have an average enrichment of about 2.96 wt %. The core average BOC2 enrichment is about 2.75 wt % for the same energy extraction as the OI scheme.

Figure 2B:
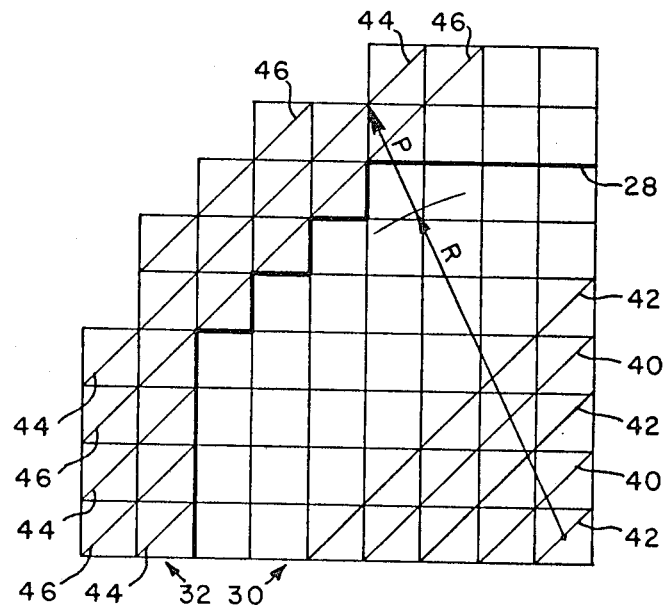
FIG. 2(b) shows a schematic identifying the inner and outer region and the checkerboard components thereof.

The second cycle scheme embodying the present invention is shown in FIGS. 2(a) and 4. The inventive concept contained therein is derived from the discovery that the inner checkerboard in the IOI scheme of FIG. 1(b), which has one component of feed fuel 10 (L) and another component of B (L-2) fuel 14, can be significantly violated yet give an overall improvement in the gross power distribution and a decrease in the required shim worth, by an interchange of feed (L) fuel 10 and C (L-1) fuel 12 according to a general procedure to be described below. The resulting new in-core fuel management scheme can be characterized by reference to an imaginary boundary 28 between an inner region 30 containing about two-thirds of the assemblies and an outer region 32 as shown in FIGS. 2(a) and 2(b). The recommended outer boundary of the inner region consists of all assemblies intersected by a circle drawn about the core center, perpendicular to the vertical axis of the core and having a radius equal to three-quarters the distance from the core center to the closest point on the outer edge of the core periphery. In FIG. 2(b), the distance to the periphery is labeled P and the boundary circle radius is labeled R.

The following table summarizes the feed fuel assembly properties represented in FIG. 4. The numeral 34 in FIG. 4 indicates the previous location of the A, B, and C assemblies. The numeral 36 in the lower right corner of the D assemblies indicates the type of shim loadings and distribution resulting from application of the method to be described below.

TABLE 2

| | Feed Fuel Design for Second Cycle Using the Invention As Shown in FIG. 4 | | |
|---|---|---|---|
| Assembly Type | No. Shims per Assembly | No. of Assemblies | Enrichment | Shim Loading |
| D401  | 0 | 32 | 3.28 | 0    |
| D*402 | 8 | 16 | 3.01 | 1.59 |
| D*403 | 4 | 8  | 3.01 | 1.82 |
| D*404 | 8 | 8  | 3.01 | 1.87 |
| D*405 | 8 | 4  | 3.01 | 2.21 |
| D*406 | 8 | 8  | 3.01 | 1.99 |
| D*407 | 4 | 4  | 3.01 | 3.12 |

The following is a detailed description of the method of implementing the invention. The intent is to satisfy certain reactivity and power relationships at the beginning of each cycle, which have been found to consistently produce, particularly at EOC, the advantages of the invention as described above. This method instructs one to arrange fuel at BOC by first determining what the limiting K infinite (hereinafter K) balance in the core can be at EOC and still satisfy the local fuel rod peaking limits, then working back to the feed assembly enrichment, shim strength, and placement that will, with burnup, come within the EOC K balance. The steps in the method are based more on the characteristics of the core and fuel assembly design than on the specific fuel management scheme used the prior cycle. Thus, one familiar with the basic core and fuel assembly characteristic of a particular reactor in which prior art fuel management techniques have been used, can with relatively little effort implement the present invention.

First, the core geometry is divided into an inner region which contains approximately two-thirds of the assemblies, and an outer region containing the remainder of the assemblies. A recommended boundary between the regions is a circle about the core center having a radius equal to three-quarters the shortest distance from the core center to the core periphery. From previous, commonly available calculations, the ratio of the hottest fuel rod in the inner region 30 to the average rod in the inner region is determined. This ratio, $Pi/\bar{P}i$, is preferably obtained from existing fuel management schemes which use the present invention or the IOI technique, but OI power distributions can be used if the calculated ratio is augmented by the ratio of power of an EOC feed assembly to the power of an adjacent EOC twice-burned assembly. This augmentation factor can be determined from a checkerboard calculation having typical end of cycle fuel characteristics.

Figure 6:
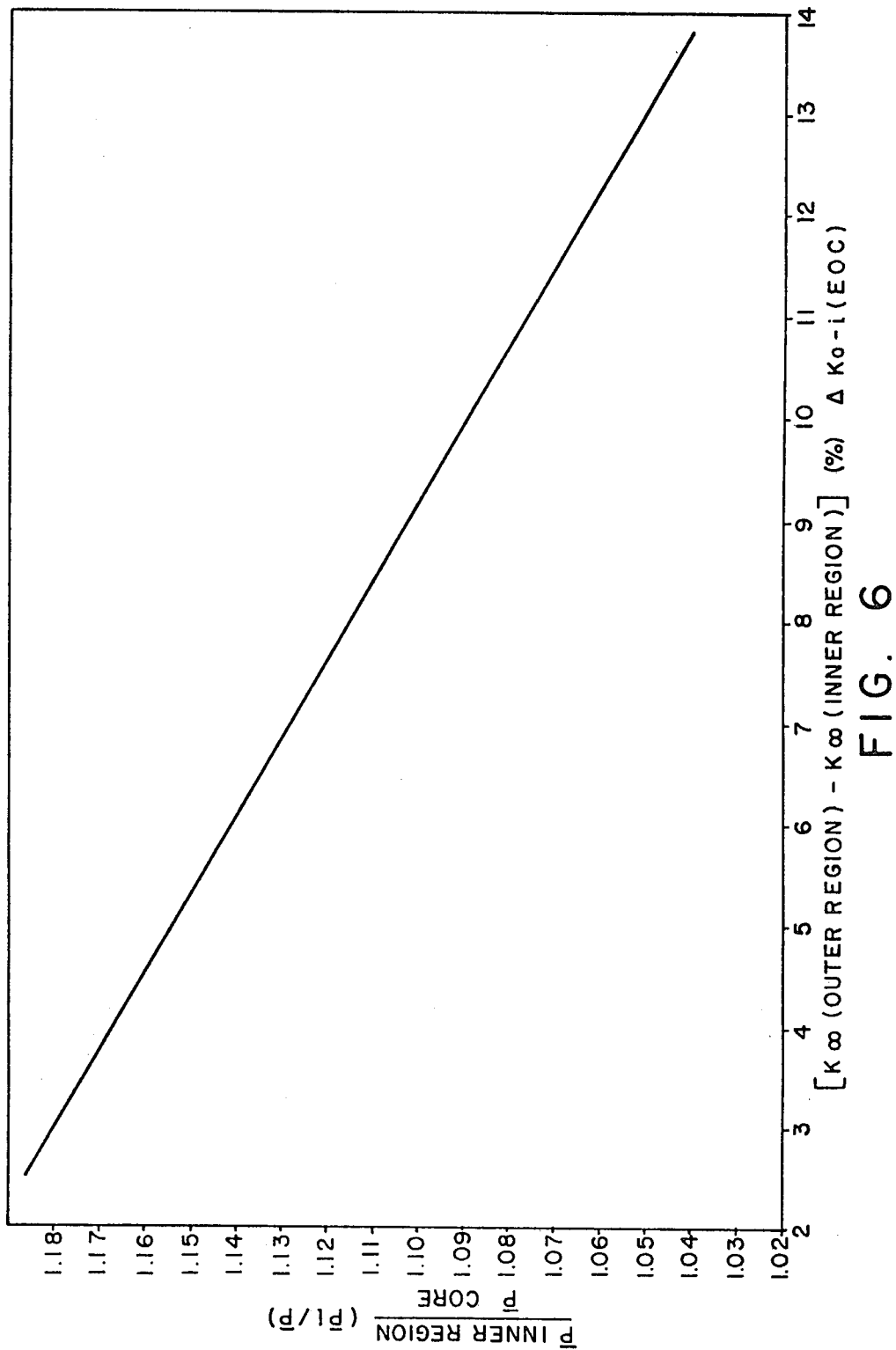
FIG. 6 shows a typical relationship between the power fraction in the inner region of the core and the difference in K infinite between the outer and inner regions.

The next step is to determine the relationship at EOC of the difference in K between the outer region 32 and the inner region 30 ($\Delta K_{o-i}$), and the resulting ratio of the average power in the inner region to the core average power, $\bar{P}i/\bar{P}$. FIG. 6 shows this relationship for the 241 assembly and the 217 assembly cores shown in various other figures, where the basic fuel assembly design shown in FIG. 5 is employed. This relationship is determined from surveying several end of cycle power distributions from any fuel management scheme wherein the absorption of all shim poison material is cancelled from the calculation so as to represent zero shim residual.

The designer then chooses the design target axially integrated radial peak fuel rod to core average rod power ratio, commonly known as $F_r$, a value usually imposed on the designer as a consequence of safety considerations. By dividing $F_r$ by the ratio $Pi/\bar{P}i$, the maximum permitted value of $\bar{P}i/\bar{P}$ consistent with the design target $F_r$ is obtained. In the present example, $F_r$ is 1.41 and $Pi/\bar{P}i$ is 1.28. The required division indicates a permitted inner region power ratio $\bar{P}i/\bar{P}$ of about 1.10. Referring again to FIG. 6, it can be seen that the end of cycle difference $\Delta K_{o-i}(EOC)$ required to produce a $\bar{P}i/\bar{P}$ equal to 1.10 is 9.2%.

In order to obtain the same K difference at beginning of cycle $\Delta K_{o-i}(BOC)$ to assure an $F_r$ less than 1.41 based on the difference in K determined immediately above $\Delta K_{o-i}(EOC)$, a correction must be made for the difference in regionwise exposure between end of cycle and beginning of cycle. The first step is the determination of the difference in accumulated exposure between the inner and outer regions over the cycle. This difference is just $(\bar{P}i/\bar{P} - \bar{P}o/\bar{P})*$ CYCLE LENGTH. In the present example where $\bar{P}i/\bar{P}$ is 1.1, $\bar{P}o/\bar{P}$ for the outer one-third core is 0.8, and for a cycle length of 10,000 MWD/MTU, the inner region accumulates an additional 3,000 MWD/MTU relative to the outer region. This difference between inner and outer region exposure is converted into a reactivity difference according to well-known derivatives of the change in core K with exposure. In the present example, the adjusted reactivity difference (unshimmed) at BOC2 is about 6.5%. This BOC2 $\Delta K$ must be further adjusted to account for the shim residual poison carried over from the EOC1 batch B and a few C fuel assemblies. This EOC1 shim residual poison is depleted during the course of cycle 2 and does not contribute to the difference in regionwise K at the EOC 2. The adjusted reactivity difference at BOC2, allowing for the shim residual carried over from cycle 1, is about 7.5% $\Delta K$. As will be described below, the difference between this BOC2 value and the EOC2 regionwise reactivity difference of 9.2% $\Delta K$ is accounted for in the design through the placement of shims in the fresh assemblies. It is the latter reactivity difference, of 9.2% $\Delta K$, that the designer strives for an order not to exceed a peak fuel rod power $F_r$ of 1.41. Experience shows that in a scheme arranged with the present method, the absolute value of the peak and the regionwise power density $\bar{P}i/\bar{P}$ remain fairly constant throughout the burnup cycle.

The next step is to make a rough estimate of the required fresh feed enrichment in the D batch, which can be obtained by taking the core average initial enrichment required to produce the desired second cycle length using the IOI scheme and adding about 0.15 wt %, or using the OI scheme and subtracting about 0.4 wt %. In the present example, the D feed enrichment is about 3.12 wt %, and the beginning BOC2 core average enrichment is about 2.85 wt %.

At this point, the following target characteristics have been estimated for BOC2: the reactivity difference between the outer and inner regions (9.2%), the amount of this reactivity difference that should be distributed as shims in the fresh assemblies in the inner region (1.7%), and the average enrichment of the fresh fuel (3.12 wt %). It remains to choose the specific shim loadings (boron content) for the fresh assemblies, and to arrange all the assemblies in the reactor core.

This can be facilitated by performing a few preliminary trial and error hand calculations of $\Delta K_{o-i}(BOC)$ based on known values of K for each fuel assembly in the core at BOC2. The assemblywise K's can be obtained by performing a single core reactivity calculation at the estimated BOC2 soluble boron concentration with no xenon and peak samarium in the burned (L-1, L-2, . . . L-N) assemblies. Fresh assemblies having a variety of shim loadings are included in this calculation, so that a relation between K and shim loading is determined. The adequacy of specific shim loadings and fuel assembly arrangements can be estimated through trial and error according to the following plan.

The inner region of the core is filled with a quarter core symmetric checkerboard having one component of L and a second component of L-2 assemblies. L-1 assemblies are placed toward the core periphery. An arithmetic reactivity difference is calculated between the outer and inner regions of the core, which will generally be smaller than the target $\Delta K_{o-i}(BOC)$. Shims are located in L assemblies such that the inner region contains about 2.7% more shim worth than the outer region (1.7% in fresh assemblies and 1.0% carryover from first cycle). The inner region reactivity must be further reduced, and this is accomplished through the key step of interchanging L-1 assemblies from the outer region with L assemblies from the inner region. It will be generally found advantageous to place L assemblies in several peripheral locations. Thus in the embodiment illustrated in FIGS. 2(a) and 4, for example, the core periphery consists only of L and L-1 assemblies, and in particular no more than half the core periphery contains L assemblies. The L-1 and L assemblies are interchanged, and the shim loadings and placement are manipulated, until the hand calculation indicates the desired $\Delta K_{o-i}$(BOC) (9.2%) and the desired L assembly shim worth in the inner region (1.7%) have been achieved. At this point, customary computer calculations can be employed to fine-tune the power distribution and to verify the estimated enrichment.

FIG. 4 and Table 2 include information showing the resulting change in location of the L-1 and L-2 (and a single L-3) assemblies from EOC1 to BOC2. Also shown are the number of shims in each L assembly and the shim loading in wt % of $B_4C$ (containing natural boron) in $B_4C$-$AL_2O_3$ shim material. The invention is not limited to use with $B_4C$ shim material, however, and can be practiced, for example, with lattice shims composed of an admixture of gadolinium and fuel material ($UO_2$), or with removable shims whether or not located in the guide tube. It is well within the skill of an ordinary nuclear fuel management engineer to substitute other shim material, or other fuel lattices, without departing from the scope of the invention.

It is to be understood that once the target BOC arithmetic $\Delta K_{o-i}$ difference is achieved, a computer calculation of the power distribution during the cycle is to be made. It is expected that several iterations in which minor adjustments of shim loadings, fuel enrichment, or fuel assembly placement are made may be needed before satisfactory power distributions and EOC reactivity are obtained. After practicing the present invention a few times, however, one having ordinary skill will need only about two or three such iterations.

Referring again to FIG. 2(a) the differences in the arrangement of fuel assemblies with the present embodiment of the invention can be identified relative to the arrangements of the prior art OI scheme shown in FIG. 1(a) and the IOI scheme shown in FIG. 1(b). With respect to the boundary between the inner and outer region indicated by a heavy line 28, the present invention consists of a checkerboard pattern in the inner region having one component consisting of L (10, 10') and L-1 (12) assemblies and a second component consisting of L-2 assemblies (14). The core geometry of FIG. 2(a) is shown in FIG. 2(b) where first component 40 and second component 42 lines of the inner checkerboard and third component 44 and fourth component 46 lines of the outer checkerboard (to be later described) are indicated. The prior art does not show a checkerboard wherein the first component 40 consists mostly of L and L-1 assemblies. In the embodiment shown, the second component 42 of the inner checkerboard consists entirely of L-2 fuel and, when the center assembly is included, L-3 fuel.

It is also seen that the outer region 32 consists of a checkerboard of L assemblies on the third component 44 alternating with a fourth component 46 of L-1 and L-2 assemblies. The OI scheme of FIG. 1(a) intentionally avoids checkerboarding L fuel in the outer region. There is no discernable checkerboard pattern in the outer region of the IOI scheme shown in FIG. 1(b), since adjacent components of L-1 fuel near the periphery have no L fuel.

With respect to the OI scheme of FIG. 1(a), none of the L assemblies is shimmed, whereas in the present invention at least some of the L assemblies 10' are shimmed. Furthermore, in the present invention less than two-thirds of the L assemblies are in the outer region, whereas in the OI scheme almost all L assemblies are in the outer region.

With respect to the IOI scheme shown in FIG. 1(b), no L assemblies are on the core periphery whereas in the present invention there are several L assemblies on the periphery. Furthermore, every L assembly 10' is shimmed in the IOI scheme, whereas in the present invention the outer region includes at least some unshimmed assemblies 10.

The above comparison of the present invention with the prior art is based on the preferred embodiment of the invention. As will be described below, different fuel management objectives may require different relative fractions of L, L-1, L-2, . . . L-N assemblies in the core, and the checkerboard components may therefore not be as perfectly filled as in the present embodiment. Nevertheless, the essential characteristic of the present invention, the first component of the inner checkerboard consisting mostly of L and L-1 fuel, is found in all embodiments of the invention.

Figure 7:
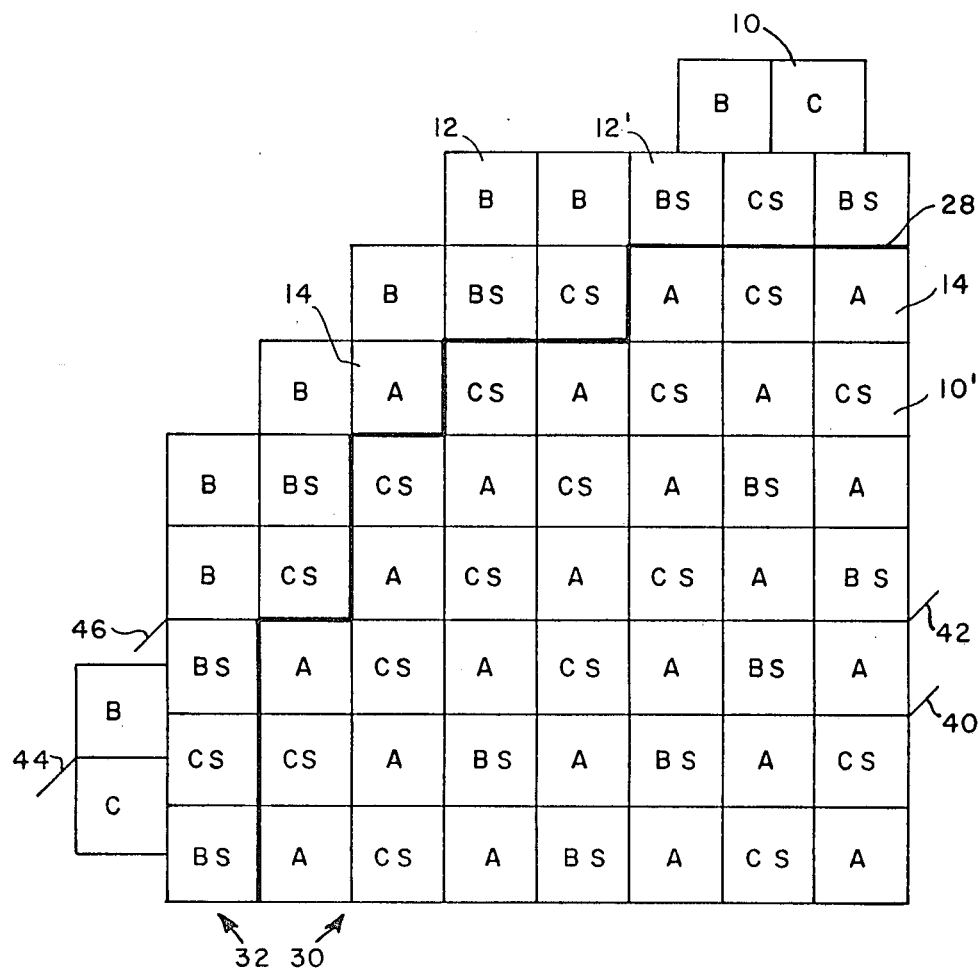
FIG. 7 shows the present invention in a first cycle scheme for a core having 217 assembly locations.

FIG. 7 shows the invention practiced in the first cycle of a core having 217 assembly locations. The core contains unshimmed A fuel 14, shimmed (BS) 12' and unshimmed B fuel 12 and shimmed (CS) 10' and unshimmed C fuel 10. In this embodiment, the first component 40 of the inner region consists of L (10, 10') and L-1 (12, 12') assemblies, and the second component 42 consists of L-2 (14) assemblies. In the outer region the third component 44 is chosen from L, L-1 assemblies and the fourth component 46 is chosen for L, L-1, and L-2 assemblies. Although a few minor modifications are required to the outline of steps discussed previously for implementing the inventive scheme, an ordinarily skilled nuclear reactor fuel management engineer can easily adapt the above procedures for use in designing the first cycle. For example, it is well known that in the first cycle most or all of the B (L-1) as well as the C (L) assemblies require substantial shim loadings.

Figure 8:
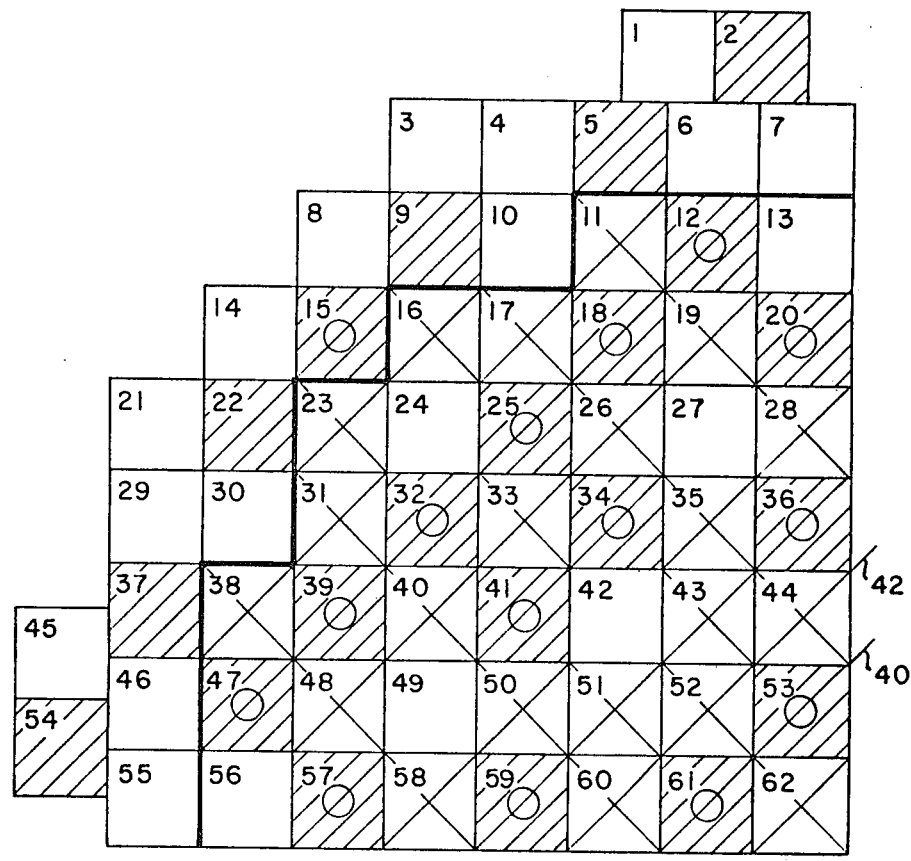
FIG. 8 shows the present invention in a later cycle for a core having 217 assembly locations.

FIG. 8 shows a later cycle scheme in the 217 assembly core in which the first component of the inner checkerboard contains four L-2 assemblies in each quadrant (assembly locations 16, 23, 43 and 51). This deviation from a perfect L and L-1 first component is sometimes the best way to accommodate peculiarities of the core power distribution in which certain assembly locations exhibit high power peaks. It is believed that a minimum of two-thirds of the first component locations must contain L and L-1 assemblies, and that at least one-third of all L assemblies be in the inner region, in order not to depart from the inventive concept. It is noted that it may not be necessary to use shims in every L assembly of the first component, especially if several different enrichments are used in each batch. This would permit concentrating the desired shim worth in only a few L assemblies in the inner region. Although such an arrangement falls within the scope of the invention, it is believed that the power distribution cannot be controlled if more than one-third of the L assemblies in the inner region are unshimmed.

Figure 9:
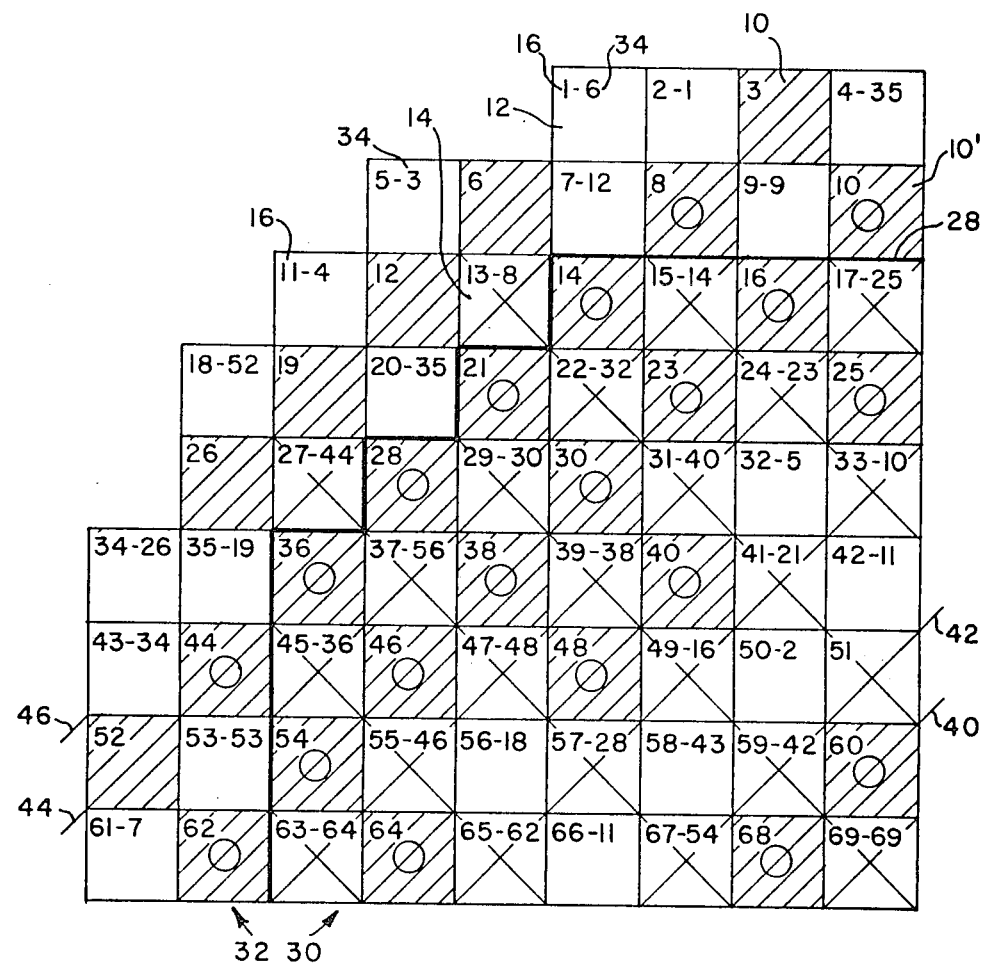
FIG. 9 shows the present invention in a second cycle fractional batch (z=2.62) scheme that immediately follows the first cycle scheme shown in FIG. 3.
Figure 10:
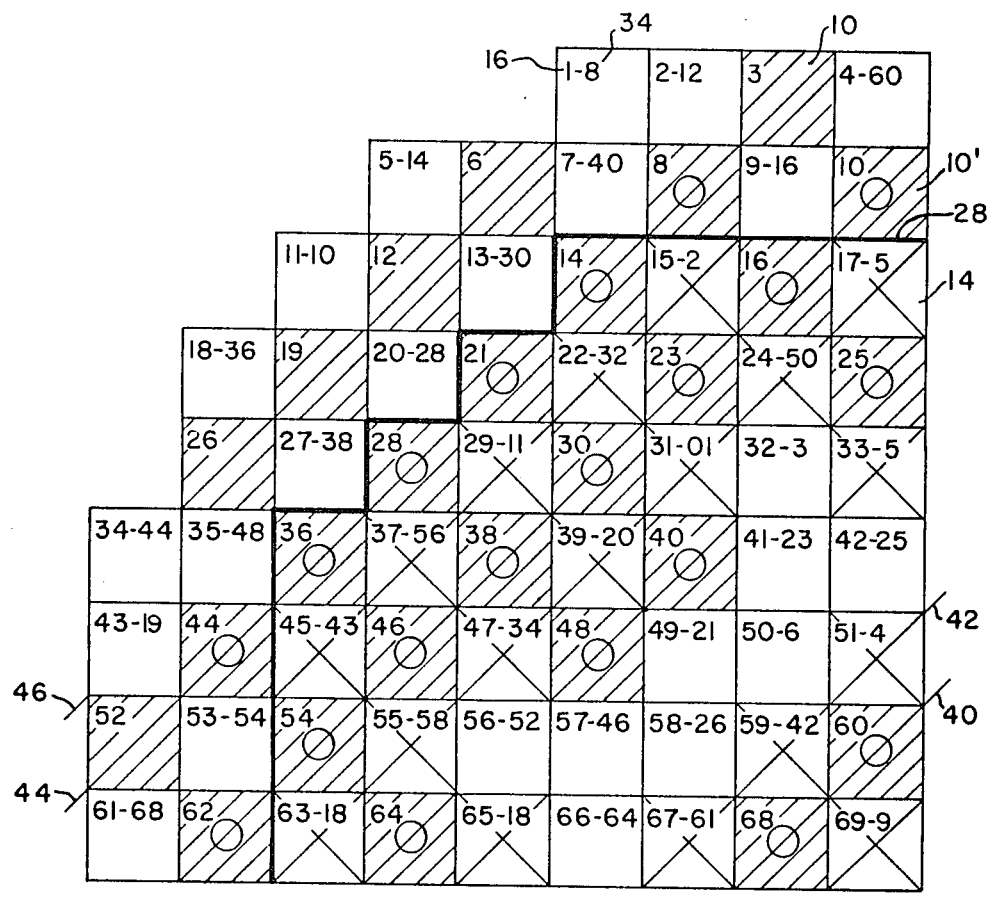
FIG. 10 shows the present invention in a third cycle fractional batch scheme that immediately follows the scheme shown in FIG. 9.

Referring now to FIGS. 9, and 10, there is shown an application of the present invention in the 241 assembly core designed for fractional batch fuel cycles. In fractional batch management, the distinction between a lot of fuel and a batch of fuel becomes important. In the normal three batch fuel management, a batch and a lot are synonymous because all the assemblies in a batch remain in the core for the same number of cycles and are removed together. In the fractional batch scheme shown in FIGS. 9, and 10, some assemblies of a batch are removed while others remain in the core for the next cycle. For example, in the third cycle fractional batch scheme shown in FIG. 10, the L or feed lot, 10, 10' contains 92 assemblies, the L-1 lot 12 contains 92 assemblies, and the L-2 lot 14 contains only 57 assemblies. This means that before the L-1 assemblies are shuffled for the next cycle, 35 are permanently removed from the reactor, leaving only 57 as L-2 assemblies.

In the second cycle shown in FIG. 9, the first component 40 of the inner checkerboard consists of L and L-1 assemblies, and the second component 42 consists of L-2 assemblies. In the outer region, the third component 44 consists of L and L-1 assemblies and the fourth component 46 comprises assemblies chosen from lots L-1 and L-2.

In the third cycle embodiment shown in FIG. 10, the first component 40 of the inner region checkerboard consists of L and L-1 assemblies, and the second component 42 consists of L-1 and L-2 assemblies. In the outer region checkerboard, the third component 44 consists of L and L-1 assemblies and the fourth component 46 consists of L-1 assemblies.

It can be appreciated that, as fuel management schemes become more tailored to the individual needs of particular utilities, the use of fractional batch fuel management will be more common. Nevertheless, the present invention finds application in such use and the procedures outlined above for implementing the inventive scheme can easily be adapted for use with the more complex schemes.

What is claimed is:

1. In a pressurized water nuclear power reactor having a multiplicity of elongated, square fuel assemblies supported side-by-side to form a generally cylindrical, stationary core which must be periodically refueled between burnup cycles by removing a fraction of the burned assemblies, rearranging the remaining burned assemblies, and inserting fresh assemblies, each of said cycles having a core average burnup of at least about 10,000 Mw-days per tonne, (MWD/T), the arrangement of assemblies to begin a new burnup cycle after refueling, comprising:
   (a) a generally cylindrical inner core region consisting of approximately two-thirds the total assemblies in the core and forming a figurative checkerboard array having
      (1) a first checkerboard component at least two-thirds of which consists of fresh assemblies and assemblies having burned through only one previous burnup cycle, at least some of the fresh assemblies containing fixed burnable poison shims, and
      (2) a second checkerboard component consisting of assemblies having burned through at least one previous burnup cycle; and
   (b) a generally annular outer region consisting of the remaining assemblies and including at least some but less than two-thirds of the fresh assemblies.

2. The assembly arrangement of claim 1 wherein the first component of the inner region checkerboard consists of fresh assemblies and assemblies having burned through only one previous burnup cycle.

3. The assembly arrangement of claim 1 or 2 wherein at least one but less than one-half of the fresh assemblies are on the core periphery.

4. The assembly arrangement of claim 3 wherein at least some of the fresh assemblies in the outer region are unshimmed.

5. The assembly arrangement of claim 3 wherein the shims in the fresh assemblies are permanent lattice shims.

6. The assembly arrangement of claim 3 wherein the burnable poison distribution and reactivity worth in the fresh assemblies are sufficient to deplete at least one reactivity percent during said new burnup cycle and contribute a residual reactivity worth of less than about 0.5 percent at the end of said new cycle.

7. The assembly arrangement of claim 6 wherein at least two-thirds of the fresh assemblies in the inner region contain permanent lattice burnable poison shims.

8. The assembly arrangement of claim 7 wherein the contribution to end of cycle residual reactivity worth is substantially zero.

9. The assembly arrangement of claim 7 wherein the core average burnups of the preceding and said new burnup cycles is between about 10,000 and 14,000 MWD/T.

10. The assembly arrangement of claim 7 wherein the core contains 241 assemblies and the inner region contains 145 assemblies.

11. The assembly arrangement of claim 1 wherein the core average burnup of the preceeding and said new burnup cycles is no greater than about 14,000 MWD/T.

12. The assembly arrangement of claim 2 wherein no more than half the core peripheral locations contain fresh assemblies.

13. The arrangement of claim 12 wherein the core periphery consists only of fresh assemblies and assemblies having burned through only one previous burnup cycle.

14. The assembly arrangement of claim 2 wherein the second checkerboard component in the inner region consists only of assemblies having burned through at least two previous burnup cycles.

15. The assembly arrangement of claim 14 wherein the assemblies in the outer region form a checkerboard having
   (1) a third component consisting of fresh assemblies and assemblies having burned through only one previous burnup cycle,
   (2) a fourth component consisting of assemblies having burned through at least one previous burnup cycle.

16. The assembly arrangement of claim 15 wherein the outer region checkerboard third component consist only of fresh assemblies.

17. The assembly arrangement of claim 16 wherein the core has about 241 assembly locations and the inner region consists of about 145 assemblies.

18. In a pressurized water power reactor having about 241 elongated, square fuel assemblies supported side-by-side to form a generally cylindrical stationary core, the core having produced power for at least three previous burnup cycles of at least 10,000 MWD/T each, a method for refueling the core comprising the steps of:
   (a) permanently removing from the core assemblies having experienced at least three burnup cycles;
   (b) figuratively dividing the core into a generally cylindrical inner region consisting of about 145 assembly locations and a generally annular outer region consisting of the remaining assembly locations;

(c) inserting fresh assemblies having permanent burnable poison lattice shims into the inner region and relocating burned assemblies to form a checkerboarded inner region having
  (1) a first checkerboard component consisting substantially entirely of about equal numbers of fresh assemblies and assemblies having burned through only one previous burnup cycle,
  (2) a second checkerboard component consisting substantially entirely of assemblies having burned through at least two previous burnup cycles,
(d) inserting fresh assemblies into the outer region and relocating burned assemblies to form a checkerboarded outer region having
  (1) a third component consisting substantially entirely of fresh assemblies
  (2) a fourth component consisting of assemblies having experienced at least one burnup cycle, wherein
  (3) about half the core peripheral locations are occupied by fresh assemblies.

19. In a pressurized water nuclear power reactor having a multiplicity of elongated, square fuel assemblies supported side-by-side to form a generally cylindrical, stationary core which must be periodically refueled between burnup cycles by removing a fraction of the burned assemblies, rearranging the remaining burned assemblies, and inserting fresh assemblies, each of said cycles having a core average burnup of at least about 10,000 MWD/T, the method of arranging the assemblies during refueling, comprising the steps of:
  (a) figuratively dividing the core into a generally cylindrical inner region consisting of approximately two-thirds the total assembly location in the core, and a generally annular outer region consisting of the remaining assembly locations in the core;
  (b) forming a checkerboard array of assemblies in the inner region having
    (1) a first checkerboard component at least two-thirds of which consists of fresh assemblies and assemblies having burned through only one previous burnup cycle, at least some of the fresh assemblies containing fixed burnable poison shims; and
    (2) a second checkerboard component consisting of assemblies having burned through at least one previous burnup cycle; and
  (c) placing the remainder of the assemblies including some but less than two-thirds of the fresh assemblies in the outer region.

* * * * *